April 19, 1955  R. W. WOLF  2,706,577
CLOSURE SEALS
Filed Sept. 14, 1950  3 Sheets-Sheet 1

INVENTOR
ROBERT W. WOLF,
BY Robert B. Larson
ATTORNEY

April 19, 1955 R. W. WOLF 2,706,577
CLOSURE SEALS
Filed Sept. 14, 1950 3 Sheets-Sheet 3

INVENTOR
ROBERT W. WOLF,
BY
ATTORNEY

United States Patent Office 2,706,577
Patented Apr. 19, 1955

2,706,577

CLOSURE SEALS

Robert W. Wolf, Philadelphia, Pa., assignor to Heintz Manufacturing Company, Philadelphia, Pa., a corporation of Pennsylvania Application September 14, 1950, Serial No. 184,741

1 Claim. (Cl. 220—46)

This invention relates to improvements in means for effecting a waterproof seal between a closure and structure having an opening therein which cooperates with said closure. The invention is particularly useful in, but not limited in application to, automatic electric dishwashers and the like.

It is one of the chief objects of this invention to provide an improved arrangement for effecting a waterproof seal between a closure and a frame member having an opening therein.

It is still a further object of this invention to provide an improved arrangement for effecting a waterproof seal between a closure and a receptacle, and including a flexible sealing gasket.

The invention has for another object the provision of an improved arrangement for sealing a closure, comprising an integral peripheral flange on said closure, the flange having a first portion extending transversely to the closure and a second portion extending parallel to and toward the transverse axis of said closure, flexible closure gasket means positioned between the second flange portion and the closure, the second peripheral flange portion supporting said flexible closure gasket means, the flexible closure gasket means being mounted so as to bear against the under surface of said closure and effect a liquid-tight seal at the periphery of said closure, the flexible closure gasket means also including a downwardly and outwardly extending sealing lip positioned below said second flange portion and effecting a seal between the closure and a vat located below said lip, and an expansible gasket retaining means spaced from said peripheral flange by said gasket and serving to lock the gasket on said closure flange.

Moreover, it is contemplated that this invention should provide a novel sealing arrangement for a closure in which the flexible closure gasket means includes a first slot which faces outwardly for receiving said second peripheral flange portion so as partially to support said flexible closure gasket means, said flexible closure gasket means also having a second slot in its inner surface in a plane parallel to and above the plane of said second portion of said flange, said flexible closure gasket means also further including a downwardly and inwardly extending sealing lip positioned below said second flange portion, said sealing lip effecting a waterproof seal between the closure and a vat located below such lip, and an expansible gasket retaining means spaced from said peripheral flange portions by said gasket, said gasket retaining member being rectangular and channel shaped in cross section, the upper arm of said retaining member extending into said second slot in said gasket, and the lower arm of said retaining member engaging the lower surface of said gasket near the base of said lip so as partially to support this portion of the gasket, and serving also to lock said gasket in place on said closure peripheral flange.

This invention, furthermore, provides various types of retaining means for locking the sealing gasket to the peripheral flange in order to keep the former in proper operating position, such as the use of triangular, arcuate, rectangular, trapezoidal and polygonal cross-sectional shaped, expansible metal channels, and circular, triangular, rectangular, square, and arcuate cross-sectional shaped, expansible metal bands and the like.

As will be seen, this invention provides an arrangement for mounting in a casing a vat which is open at its upper end, comprising a downwardly extending, interior portion of a casing, said downwardly extending portion terminating in an inwardly extending flange, an outwardly extending peripheral flange at the upper end of the vat, and a tub sealing gasket mounted on said inwardly extending flange, said tub gasket having an inwardly facing slot near its upper edge for receiving an outwardly extending peripheral flange on said vat, and said tub gasket also including an upwardly extending lip at its outer edge which terminates in engagement with the inner surface of said downwardly extending portion of said casing to funnel into said vat any fluid which falls on said lip. To provide such an arrangement comprises another object of the invention.

Still another object of this invention is the provision of a novel arrangement for effecting a seal between a vat mounted in a casing and a closure for said vat by providing a downwardly extending curved lip on a closure gasket means that cooperates with a flange portion of the vat when the closure is in a closed position.

It is even a still further object of this invention to provide an improved sealing and mounting arrangement for a vat and a closure therefor which is simple, economical to manufacture, accurate, and reliable in operation, and which is inexpensive to maintain.

These and other objects of the invention will be apparent from the following description and claims, taken in connection with the accompanying drawings, forming a part of this application, and in which:

Figure 2:
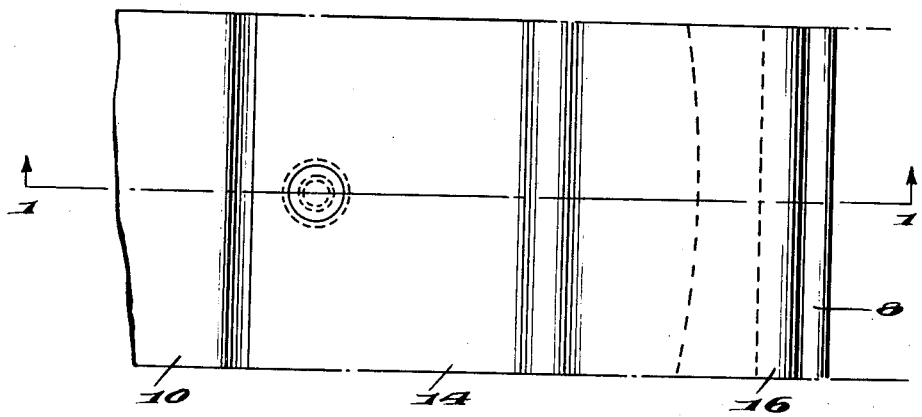
Fig. 2 is a top plan view of a portion of a hinged closure mounted on the top of a dishwasher.
Figure 1:
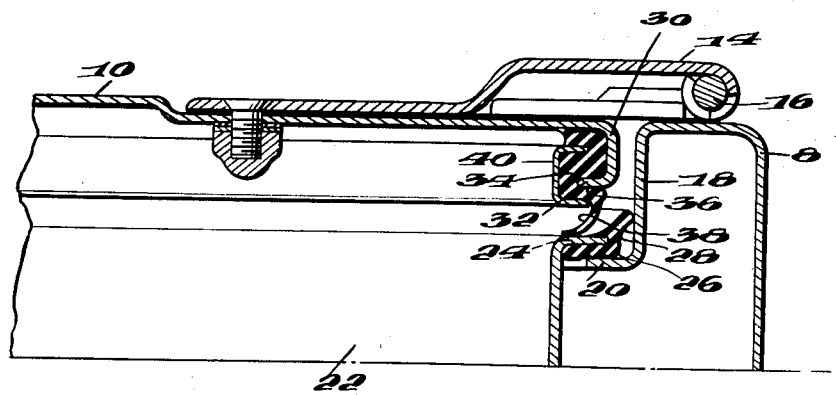
Fig. 1 is a transverse vertical sectional view, of a preferred embodiment of the invention, taken along the line 1—1 of Fig. 2, looking in the direction of the arrows, and showing my means of sealing openings between the closure or lid and the tub opening of the dishwasher machine.
Figure 3:
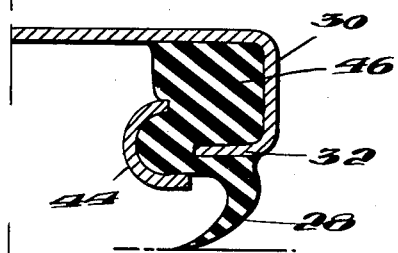
Fig. 3 is a transverse sectional view of an arcuated, channel-shaped expansible metal retainer for holding the closure sealing gasket in position.

Referring now to the drawings, there is shown in Fig. 1 a casing 8 of a dishwashing machine which supports a closure 10 by means of a hinge 14 which pivots about a horizontal hinge pin 16. The casing 8 has a horizontal portion to which the hinge is attached, and inwardly of this portion is a downwardly extending portion 18 terminating in an inwardly extending flange 20. A dishwasher vat 22 having an outwardly extending peripheral flange at its upper end as shown at 24 is supported on the flange 20 of the casing by means of a gasket 26 which is commonly referred to as the "tub gasket," and which has an upwardly extending lip 28 at its outer edge which terminates in contact with the inner surface of the casing portion 18.

The lid or closure 10 has a downwardly extending peripheral flange 30 which terminates in an inwardly directed portion 32 which is generally parallel to and extends toward the transverse axis of the closure lid 10. When the lid 10 is in closed position, the flange portion 30 is spaced inwardly a short distance from the inner surface of flange 18 carried by the casing 8.

A lid gasket is shown generally at 34. This gasket is of resilient material and is dimensioned so as to fit tightly within the space between lid flange 32 and the portion of the main body of the lid thereabove, and thus effects a liquid-tight seal of the latter at its lower surface. This gasket has a slot 36 which faces outwardly for receiving lid flange portion 32. Flange portion 32 partially supports gasket 34. The gasket also has a downwardly and inwardly curved lip 38 which engages the upper surface of vat flange 24 when the lid is in closed position, so as to provide a seal between the lid and the vat.

Gasket 34 is held securely in position by means of an expansible metal gasket retainer 40 which is U-shaped or rectangular and channel-shaped in cross section, the arms of the U extending respectively into an inner slot in the gasket 34 which is in a plane parallel to and above the plane of the second portion of said peripheral flange, and about the lower surface of the gasket near the beginning of lip 38. Retainer 40 is preferably of stainless steel and is made up of a band which is cut to a length equal to the inner periphery of the gasket 34 and is then placed in expanded position inside the gasket after the gasket has been positioned properly.

In operation, retainer 40 locks the gasket 34 securely in place, and when the lid is moved to closed position, the lip 38 on the gasket 34 provides a tight seal between the lid and the vat. The downwardly and inwardly extending disposition of lip 38 permits any fluid which washes onto the upper surface of the lip to drain therefrom readily and not to accumulate on the lip. The sloping disposition of the lip 28 on the tub gasket also facilitates draining back into the tub of any liquid which falls onto this gasket during use of the dishwasher. The provision of the tub gasket 26 between the tub and the flange 20 supporting the tub prevents any fluid from passing into the interior of the casing in a space between the casing and the vat 22, where it might cause rusting or other damage to movable parts therein. A slight resiliency in the mounting of the vat 22 is also provided by this arrangement.

In Figs. 3, 4, 5 and 6 are shown other types of expansible, metal gasket retainer channels for holding and locking the closure sealing gasket in position. In place of the U-shaped channel member 40 that is used in the preferred embodiment of my invention, an arcuated channel-shaped retainer band 44 can be utilized to hold a closure sealing gasket 46 in a locked position on peripheral flange portion 32. The upper arm of the arcuated band fits in the inner slot of the gasket 46 which the lower arm engages the lower surface of the gasket.

Figure 4:
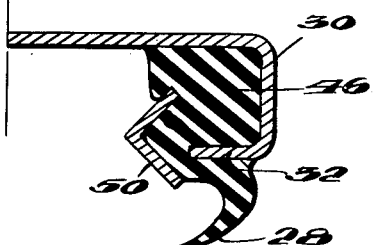
Fig. 4 is a transverse sectional view of a triangular, channel-shaped expansible metal gasket retainer.
Figure 5:
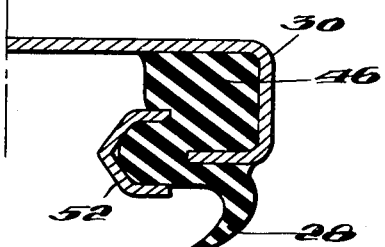
Fig. 5 is a transverse sectional view of a polygonal, channel-shaped expansible metal gasket retainer.
Figure 6:
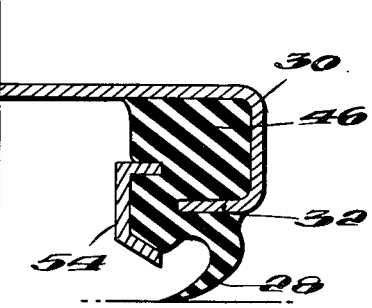
Fig. 6 is a transverse sectional view of a trapezoidal, channel-shaped expansible metal gasket retainer.

Fig. 4 shows use of a triangular, channel-shaped expansible metal gasket retainer 50 while Figs. 5 and 6 show the utilization of either polygonal or trapezoidal, channel-shaped retainers 52 and 54. All of these retainers are mounted as indicated for the U-shaped metal channel retainer 40.

Figure 7:
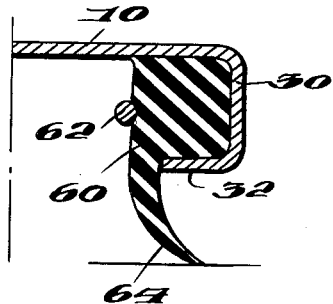
Fig. 7 is a transverse sectional view of a second embodiment of my closure sealing gasket invention, and showing my means of sealing the closure and also for sealing openings between the closure and the tub opening of the dishwasher machine.
Figure 8:
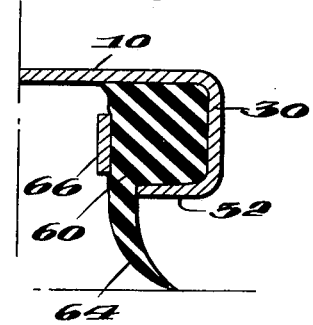
Fig. 8 is a transverse sectional view of a rectangular-shaped expansible metal gasket retainer band for holding the second embodiment of my sealing gasket in position.
Figure 9:
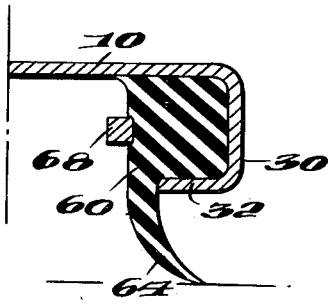
Fig. 9 is a transverse sectional view of a square-shaped expansible metal gasket retainer band.
Figure 10:
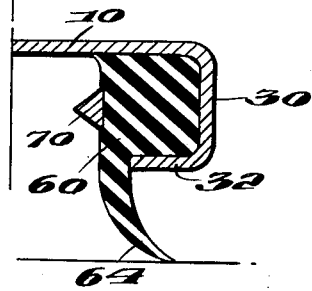
Fig. 10 is a transverse sectional view of a triangular-shaped, expansible gasket metal retainer band.
Figure 11:
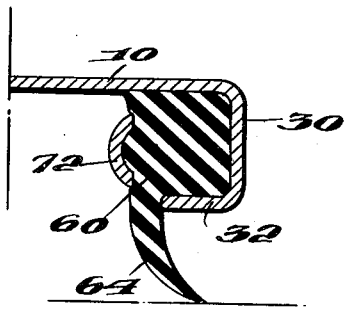
Fig. 11 is a transverse sectional view of an arcuate-shaped expansible metal gasket retainer band.

A second embodiment of my closure sealing gasket means is shown in Fig. 7. Here instead of using a closure sealing gasket that has two slots of receiving the second peripheral flange portion 32 and the upper arm of the U-shaped retainer 40, I prefer to make use of a closure gasket 60 that is partially spaced between the second flange portion 32 and the portion of the main body of the lid or closure 10 thereabove. An expansible, circular cross-section metal rod 62 is used to lock closure sealing gasket in position. It is located above the flange portion 32 and at the inner surface of the closure sealing gasket 60. A downwardly and outwardly extending lip 64, originating at the lower and inner edge of gasket 60, is used to effect a liquid-tight seal with the vat flange portion 24 located below the lip. In Figs. 8, 9, 10 and 11 are shown other types of expansible metal bands, such as a rectangular cross-sectional shaped band 66, a square cross-sectional shaped band 68, a triangular cross-sectional shaped band 70, or an arcuated cross-sectional shaped band 72.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the appended claim.

I claim:

A sealing arrangement for a circular closure, comprising an integral peripheral flange on said closure, said flange having a first portion extending transversely to the closure and a second portion extending parallel to and toward the transverse axis of said closure, flexible closure gasket means positioned partly between said second flange portion and the parallel peripheral portion of said closure, said flexible gasket means including a first slot which faces outwardly for receiving said second flange portion, said second flange portion partially supporting said flexible closure gasket means, said flexible closure gasket means being mounted so as to bear against said closure and effect a liquid-tight seal at the lower surface of said closure, said flexible closure gasket means also having a second slot in its inner surface in a plane parallel to and above the plane of said second portion of said flange, said flexible closure gasket means further including a downwardly and inwardly extending sealing lip positioned below said second flange portion, and a radially outwardly expansible gasket retaining means spaced from said peripheral flange portions by said gasket and serving to lock said gasket in place on said closure peripheral flange, said gasket retaining member being rectangular, and channel-shaped in cross-section, the upper arm of said retaining member extending into said second slot in said gasket and the lower arm of said retaining member engaging the lower surface of said gasket near the base of said lip so as to partially support this portion of the gasket.

References Cited in the file of this patent

UNITED STATES PATENTS

| | | |
|---|---|---|
| 1,975,554 | Morrissey | Oct. 2, 1934 |
| 2,002,366 | Eto | May 21, 1935 |
| 2,091,791 | Newman | Aug. 31, 1937 |
| 2,187,154 | Ingersoll et al. | Jan. 16, 1940 |
| 2,264,543 | Nauert | Dec. 2, 1941 |
| 2,264,713 | Reifenberg | Dec. 2, 1941 |
| 2,324,332 | Stoddard | July 13, 1943 |
| 2,324,333 | Stoddard | July 13, 1943 |
| 2,337,316 | Dodge | Dec. 21, 1943 |
| 2,463,516 | Buckhardt | Mar. 8, 1949 |
| 2,614,723 | Welden | Oct. 21, 1952 |